United States Patent [19]

Takeda et al.

[11] Patent Number: 5,197,244
[45] Date of Patent: Mar. 30, 1993

[54] INTERIOR PANEL UNIT FOR PERMITTING ARRANGEMENT OF CABLES AND DEVICES ON ROOM FLOOR

[75] Inventors: Fumio Takeda, Hachiooji; Yoshio Kojima, Yokohama; Tsuneo Kaneko, Narashino; Yutaka Ishibashi, Tokyo; Naoto Sasaki, Yokohama; Isako Tsushima, Tokyo, all of Japan

[73] Assignee: Kabushiki Kaisha Toshiba, Kawasaki, Japan

[21] Appl. No.: 775,015

[22] Filed: Oct. 11, 1991

Related U.S. Application Data

[62] Division of Ser. No. 429,552, Oct. 31, 1989.

[30] Foreign Application Priority Data

| Oct. 31, 1988 | [JP] | Japan | 63-142055[U] |
| Oct. 31, 1988 | [JP] | Japan | 63-275609 |
| Oct. 31, 1988 | [JP] | Japan | 63-275610 |
| Oct. 31, 1988 | [JP] | Japan | 63-275614 |
| Oct. 31, 1988 | [JP] | Japan | 63-275617 |
| Oct. 31, 1988 | [JP] | Japan | 63-275618 |
| Oct. 31, 1988 | [JP] | Japan | 63-275619 |
| Oct. 31, 1988 | [JP] | Japan | 63-275620 |

[51] Int. Cl.⁵ .............................. E04B 5/48
[52] U.S. Cl. .................. 52/221; 52/126.5; 52/582
[58] Field of Search ......... 52/126.6, 126.5, 220, 52/221, 503-505, 582, 236.8; 174/48

[56] References Cited

U.S. PATENT DOCUMENTS

| 3,793,793 | 2/1974 | Dobbins | 52/221 |
| 3,973,366 | 8/1976 | Balone et al. | 52/221 X |
| 4,250,674 | 2/1981 | Feist | 52/220 |
| 4,593,499 | 6/1986 | Kobayashi et al. | |
| 4,631,879 | 12/1986 | Kobayashi et al. | |
| 4,637,181 | 1/1987 | Cohen | 52/126.5 |
| 4,640,067 | 2/1987 | Hagemann et al. | 52/220 |
| 4,682,453 | 7/1987 | Holmgren | 52/126.5 X |
| 4,773,196 | 9/1988 | Yoshida et al. | 52/220 X |
| 4,850,163 | 7/1989 | Kobayashi et al. | 52/221 X |
| 4,852,315 | 8/1989 | Fukayama | 52/220 |
| 4,883,503 | 11/1989 | Fish | 52/220 |
| 4,905,437 | 3/1990 | Heather | 52/221 X |
| 5,052,157 | 10/1991 | Ducroux et al. | 52/126.6 |
| 5,090,169 | 2/1992 | Takeda et al. | 52/220 |
| 5,111,627 | 5/1992 | Brown | 52/126.5 |

FOREIGN PATENT DOCUMENTS

| 59-150854 | 8/1984 | Japan . |
| 59-208898 | 11/1984 | Japan . |
| 60-40472 | 3/1985 | Japan . |
| 60-43564 | 3/1985 | Japan . |
| 60-43565 | 3/1985 | Japan . |
| 60-43566 | 3/1985 | Japan . |
| 60-98043 | 6/1985 | Japan . |
| 60-98044 | 6/1985 | Japan . |
| 60-98045 | 6/1985 | Japan . |
| 60-112953 | 6/1985 | Japan . |
| 60-112954 | 6/1985 | Japan . |
| 60-192051 | 9/1985 | Japan . |
| 60-195260 | 10/1985 | Japan . |
| 60-242252 | 12/1985 | Japan . |
| 61-76045 | 5/1986 | Japan . |
| 62-284854 | 12/1987 | Japan . |

*Primary Examiner*—David A. Scherbel
*Assistant Examiner*—Lan M. Mai
*Attorney, Agent, or Firm*—Oblon, Spivak, McClelland, Maier & Neustadt

[57] ABSTRACT

This invention relates to an interior panel unit having a structure in which a plurality of rectangular floor base members to be installed on a foundation floor of a room are connected to each other by base joint members. A plurality of fundamental support members having the same height and plurality of connecting support members having the same height as that of the fundamental support members are located on each floor base member. Each floor panel member supported by the fundamental support members and the connecting support members is arranged to assure a predetermined space with the corresponding floor base member. Cables and various types of equipment which constitute an office-automation system are mounted in the space defined by the floor panel member and the floor base member. The space defined by the floor panel member and the floor base member is partitioned by vertical and horizontal separator members. The cables and various types of equipment are appropriately arranged in the partitioned space.

3 Claims, 15 Drawing Sheets

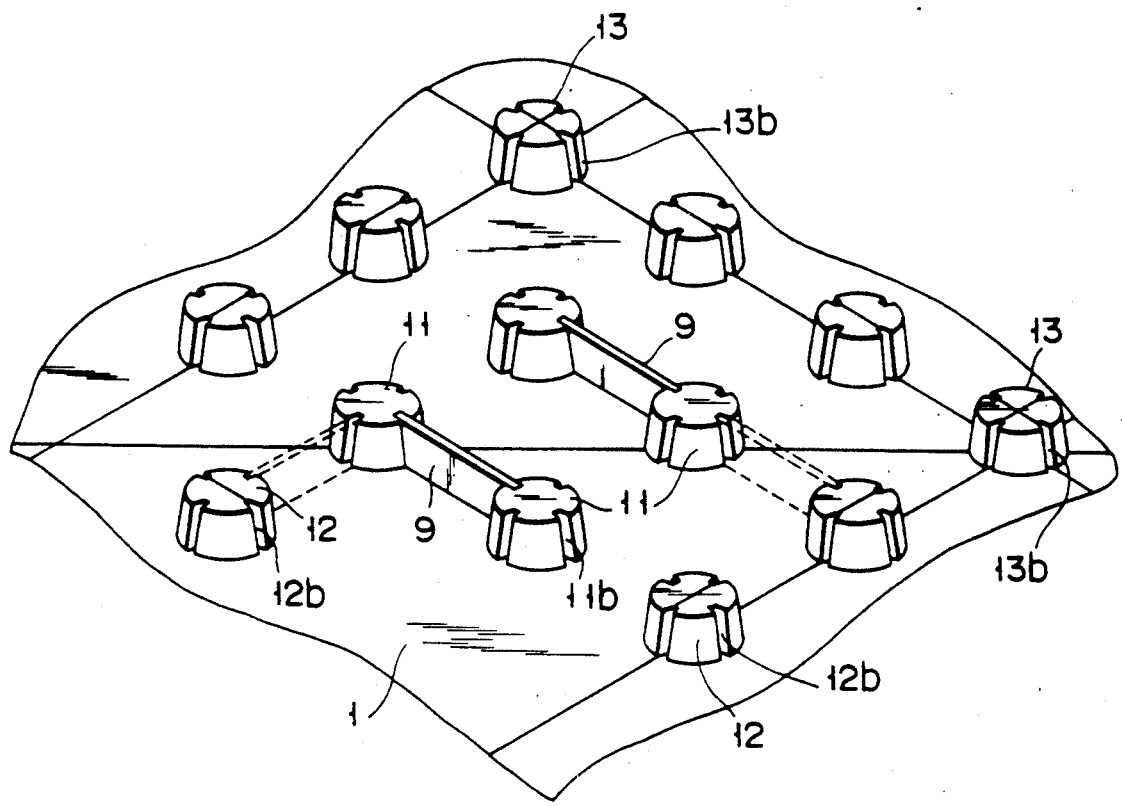
F I G. 12A
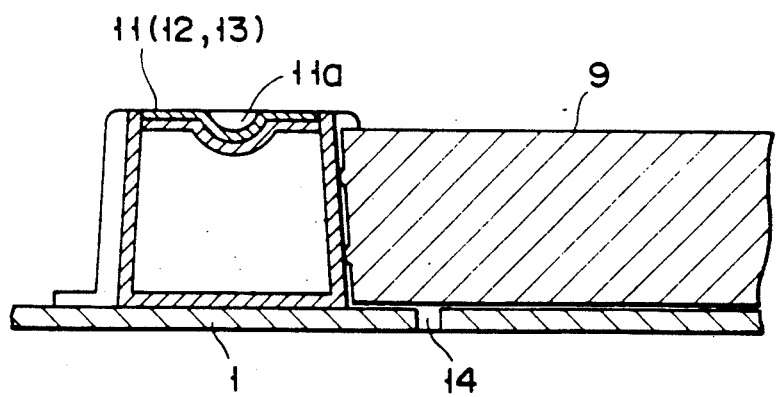
F I G. 12B

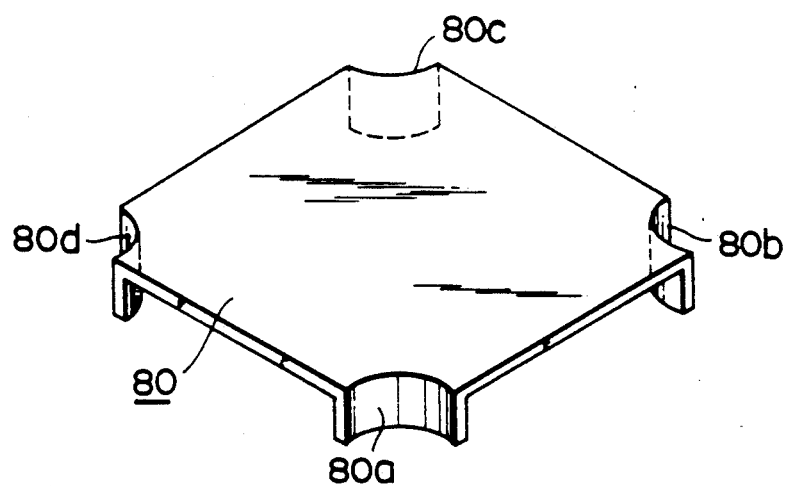
F I G. 14A
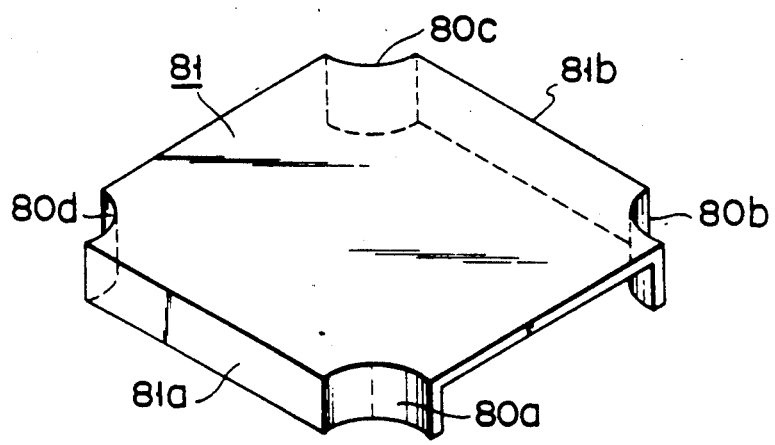
F I G. 14B
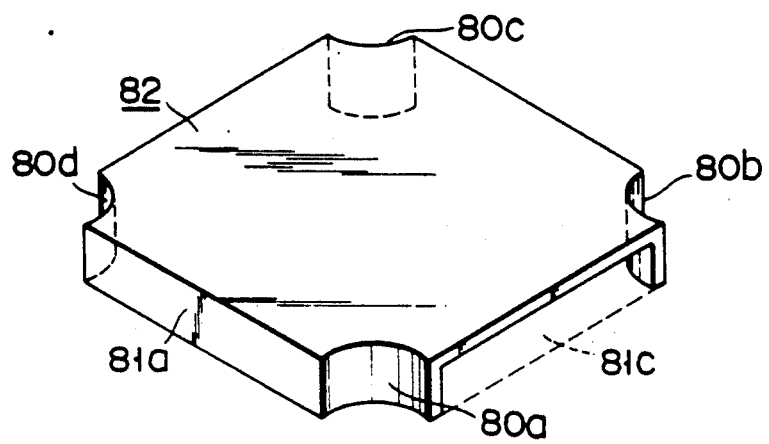
F I G. 14C

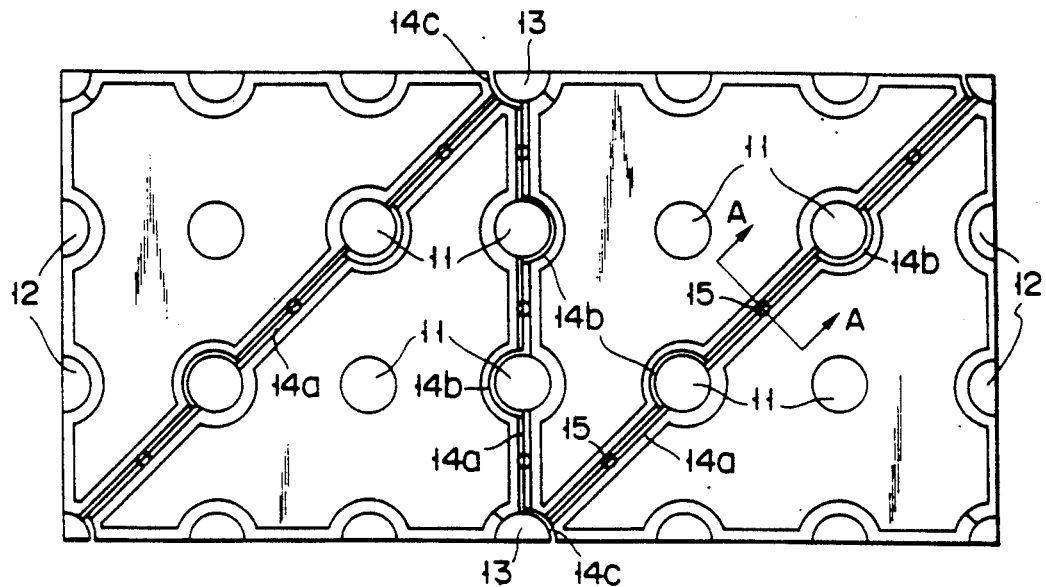
F I G. 17A
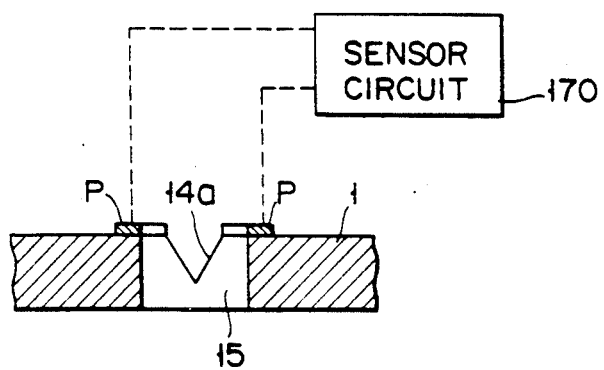
F I G. 17B

INTERIOR PANEL UNIT FOR PERMITTING ARRANGEMENT OF CABLES AND DEVICES ON ROOM FLOOR

This is a division of application Ser. No. 07/429,552, filed on Oct. 31, 1989 now abandoned.

BACKGROUND OF THE INVENTION

1. Field of the Invention

The present invention relates to an interior panel unit for permitting an arrangement of cables and devices on a room floor, the panel being used in an office or computer room to arrange an office-automation system.

2. Description of the Related Art

A conventional interior panel unit is available to realize an office-automation system by arranging power cables, signal cables, and various types of equipment on a room floor in an office or computer room, as described in U.S. Pat. Nos. 4,593,499 and 4,631,879.

More specifically, a given unit has blocks having shapes to be engaged with each other at a peripheral portion of a rectangular floor base installed on a foundation floor surface of a room, and blocks on each floor base are engaged with and coupled to each other to form each floor base on the foundation floor surface.

In another unit, a plurality of columnar members are mounted on a lower floor base installed on a foundation floor surface, and an upper floor base is supported by the columnar members with a gap corresponding to the height of each columnar member from the foundation floor surface.

However, in the former unit, an operation for coupling the blocks of the adjacent floor bases is required. This operation is cumbersome and time consuming. Therefore, much labor is required to install the floor bases on the entire surface of the foundation floor base of the room. In addition, when each block is designed each that it fits tight into another, thereby to form a strong unit. Much labor is also required to form such a unit. Consequently, it takes much time to assemble and install the interior panel unit. When the blocks are loosely coupled to each other, the installation can be facilitated. However, the upper floor consisting of floor bases does not have a sufficiently flat surface or adequate stability.

The latter unit has a structure wherein the lower floor base is installed on the foundation floor surface of the room and the upper floor base is supported and fixed through the plurality of columnar members. The adjacent lower floor bases are not coupled to each other. For this reason, the lower floor bases are not integrally coupled. Therefore, when the upper floor base is supported and fixed, stability and flatness of the upper floor surface consisting of the upper floor bases are degraded.

SUMMARY OF THE INVENTION

It is an object of the present invention to provide an interior panel unit for permitting an arrangement of cables and devices on a room floor, wherein an installation operation can be simplified, operability can be improved, and stability and flatness of an upper floor surface upon installation can be improved.

In order to achieve the above object of the present invention, there is provided an interior panel unit for creating an office-automation system by arranging power and signal cables and devices on a room floor, comprising: floor base member to be installed on a foundation floor of a room; a plurality of fundamental support members fixed to upper surface of each of the floor base members, and having upper surfaces located at the same height from the upper surface of each floor base member; a plurality of connecting support members fixed to peripheral portions of each floor base member, and having upper surfaces located the same height as those of the fundamental support members; base joint members for connecting the connecting support members arranged on a plurality of floor base members in a state wherein the floor base members are installed on the same surface; and floor panel members brought into contact with the upper surfaces of the plurality of fundamental support members and the upper surfaces of the connecting support members to form a surface of the room floor and cooperating with the floor base members to define an internal space for installing cables and devices therein.

BRIEF DESCRIPTION OF THE DRAWINGS

FIG. 12A is a perspective view showing an arrangement of a vertical separator member according to a third embodiment of the present invention;

FIG. 12B is a sectional view showing an arrangement of the vertical separator member according to the third embodiment of present invention;

FIGS. 14A to 14C are perspective views respectively showing arrangements of the vertical or horizontal separator members according to the third embodiment of the present invention;

FIG. 17A is a plan view showing an arrangement of a floor base member according to a fifth embodiment of the present invention;

FIG. 17B is a sectional view showing an arrangement of the floor base member according to the fifth embodiment of present invention;

DETAILED DESCRIPTION OF THE PREFERRED EMBODIMENT

Preferred embodiments of the present invention will be described with reference to the accompanying drawings.

Figure 1:
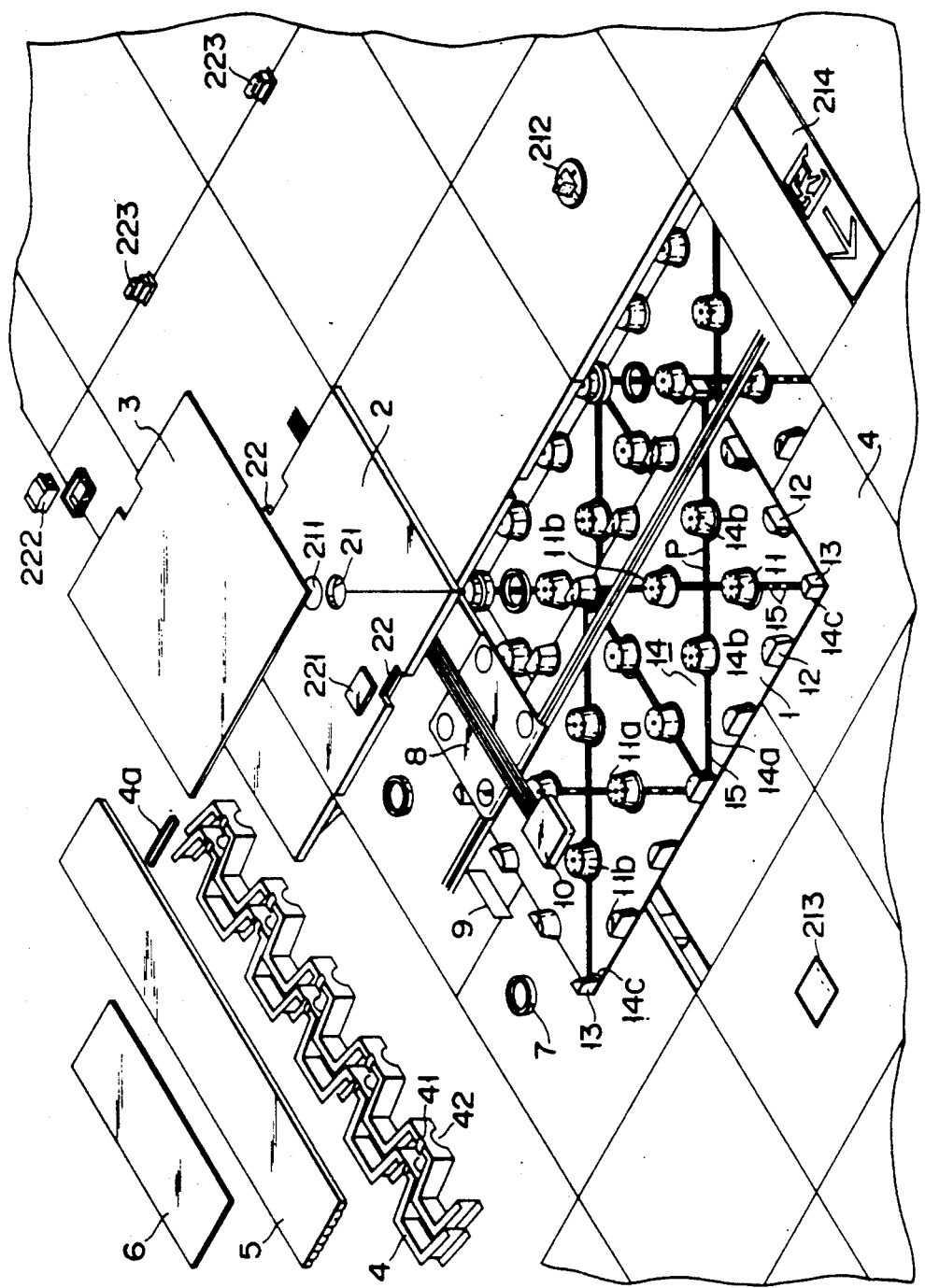
FIG. 1 is an exploded perspective view showing an overall arrangement of an interior panel unit according to the present invention.

FIG. 1 is a view showing an overall structure of an interior panel unit according to the present invention. The unit comprises floor base members 1 installed on a foundation floor surface 4 which defines a space of an office or computer room. Each floor base member 1 consists of a flexible synthetic resin (e.g., polypropylene) as a base material and comprises a rectangular plate having a ratio of a long side to a short side of 2 : 1 (e.g., 1 m : 500 mm).

Fundamental support members (fundamental columns) 11 for supporting a floor panel member 2 are located on the surface of the floor base member 1 except for the edge at predetermined intervals. Connecting support members (connecting columns) 12 are located at the edge except for corners of the upper surface of the floor base member 1. Connecting support members 13 are located at the corners of the upper surface of the floor base member 1. The support members 11 to 13 consist of a fire-retardant material such as foamed concrete and have the same height. It should be noted that 10 fundamental support members 11, 14 connecting support members 12 extending at the edge except for the corners, and four connecting support members 13 at the four corners are formed on each floor base member 1.

Each fundamental support member 11 comprises a truncated cone and has a recess 11a at almost the center of the upper surface which is to contact the surface of the floor panel member 2. The recess 11a serves to prevent lateral shift of the floor panel member 2. Each connecting support member 12 extending at the edge except for the corners consists of a half piece which is obtained by cutting a truncated cone corresponding to the fundamental support member 11 in the vertical direction (i.e., a direction perpendicular to the surface of the floor base member 1). Each connecting support member 13 extending at each corner of each floor base member 1 comprises a ¼ piece obtained by cutting the conical member corresponding to the fundamental support member 11 in the vertical directions. A slit-like vertical groove 11b is formed in the circumferential wall of each of the support members 11 to 13. The vertical grooves 11b are formed to support both ends of a vertical separator member 9 bridged between the adjacent ones of the support members 11 to 13. The vertical separator member 9 is a plate member for partitioning the horizontal space on the surface of the floor base member 1.

V-shaped grooves (to be referred to as V-grooves hereinafter) 14a are formed in the surface of the floor base member 1 to connect the adjacent ones of the support members 11 to 13 with lines on a line obtained by connecting the middle points of the long sides and diagonal lines within each one of rectangles (squares) obtained by dividing the rectangular area into halves. Grooves 14b are formed to surround the ½ bottom arc of the fundamental support member 11 and the entire bottom arc of the connecting support member 12 extending at the edge, and a groove 14c is also formed to surround the entire bottom arc of the connecting support member 13 extending at each corner. The grooves 14a to 14c serve as guide grooves for discharging leaking water. Guide holes 15 are formed in the V-grooves 14a at predetermined intervals to discharge water to the foundation floor surface.

The floor panel member 2 is a member supported by the support members 11 to 13 of the floor base member 1 to constitute an upper floor surface of the room. Each floor panel member 2 consists of a rectangular (square) plate member having an area ½ that of each floor base member 1. More specifically, each side of the square of the floor panel member 2 is, e.g., 500 mm. A circular opening 21 is formed at almost the center of each floor panel member 2. Rectangular notches 22 are formed at opposite sides of each floor panel member 2. The circular opening 21 is used to set various devices such as a circular blank piece 211, a floor outlet 212, an address panel 213, and a light-accumulating panel (nighttime marker lamp) 214. Each rectangular notch 22 is used to install various devices such as a rectangular blank piece 221, a floor outlet 222, and a partition joint part (partition connecting piece) 223. A projection is formed on the lower surface (i.e., a surface which is brought into contact with the support members 11 to 13) of the floor panel member 2 to engage with the recess 11a formed on almost the center of the upper surface of the corresponding fundamental support member 11.

A floor carpet 3 is installed on the surface of the floor panel member 2. The floor carpet 3 consists of a fire-retardant material and has a size corresponding to the area of the floor panel member 2. The floor carpet 3 has an arbitrary shape in accordance with the circular opening 21 and rectangular notches 22 formed in the floor panel member 2.

When the plurality of floor base members 1 are arranged on the foundation floor surface of the room, the adjacent connecting support members 13 extending at the four corners are connected to each other by base joint members 7. Each base joint member 7 is engaged with a truncated cone obtained by combining four adjacent connecting support members 13 to connect these connecting support members 13. The adjacent connecting support members 12 extending at edges of the adjacent floor base members 1 are connected by the corresponding base joint members 7. The plurality of adjacent floor base members 1 are connected by the base joint members 7.

Horizontal separator members 8 are prepared to partition the space defined by the floor panel members 2 and the floor base members 1 so as to partition the space vertically. Each horizontal separator member 8 comprises a plate member which is engaged with four adjacent fundamental support members 11 extending on the surface of the floor base member 1 to partition the vertical space. Four holes each having a diameter slightly larger than that of the hole almost at the center of the frustoconical support member 11 are formed on the vertical separator member 8 so that the vertical separator member 8 is supported almost at the centers of the corresponding fundamental support members 11. By utilizing the space partitioned by these vertical separator members 8, network devices 10 connected to, e.g., signal and power cables can be three-dimensionally arranged between the floor panel members 2 and the floor base members 1.

When the floor base members 1 and the floor panel members 2 are installed to form an upper floor surface of a room, there are always corners where the floor base members 1 and the floor panel members 2 cannot be installed. Boarder fundamental members 4 are installed on the foundation floor surface of the room at these corners. Each boarder fundamental member 4 comprises a strip member having a rectangular wave shape and a predetermined width. A plurality of boarder fundamental members 4 are combined in accordance with the size of a boarder area where the floor base members 1 and the floor panel members 2 cannot be installed. The plurality of boarder fundamental members 4 are installed in this boarder area. In this case, a boarder support joint 4a is fitted in a joint mounting groove 41 formed in each boarder fundamental member 4, so that the boarder fundamental members 4 can be integrally formed. A boarder floor panel 5 is installed on the upper surface of each border fundamental member 4. The boarder floor panel 5 has longitudinal grooves so that it can be cut to obtain a desirable width in accordance with the boarder area. In addition, a boarder floor carpet 6 similar to the floor carpet 3 is installed on the boarder floor panel 5.

The structures of the respective members of the interior panel unit will be described in detail according to the first to seventh embodiments.

Figure 2:
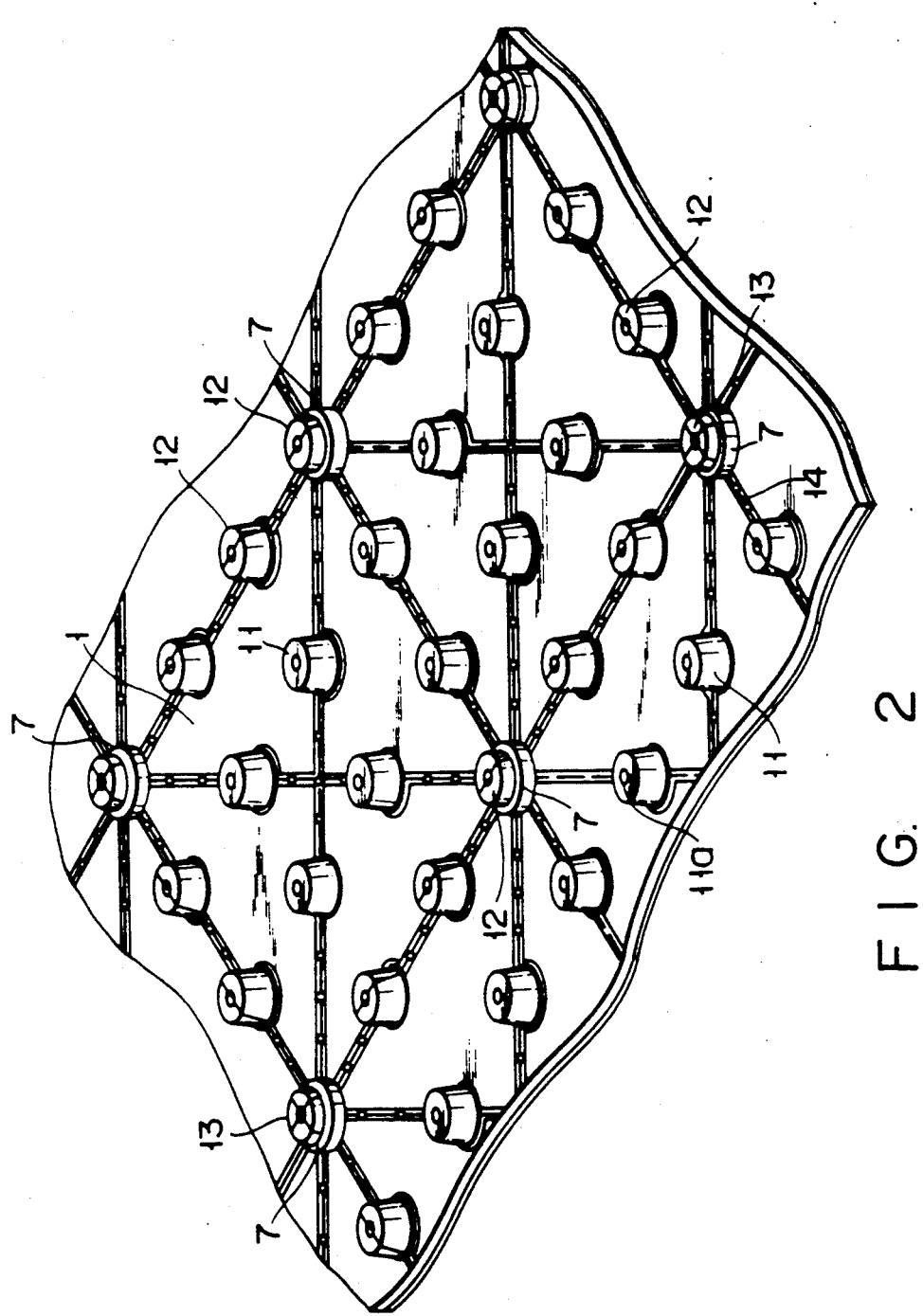
FIG. 2 is a perspective view showing a structure of a floor base member according to a first embodiment of the present invention.

FIG. 2 is a view showing an arrangement of the floor base member 1 according to the first embodiment. A plurality of floor base members 1 are arranged on a foundation floor surface of a room. In this case, connecting support members 12 of the adjacent floor base members 1 are brought into contact to constitute truncated cones. The adjacent connecting support members 12 are connected by the base joint members 7. Four adjacent connecting support members 13 at the adjacent corners of the four floor base members 1 are combined to constitute a truncated cone which is then connected by the base joint member 7. Therefore, the adjacent floor base members 1 can be connected to each other and are firmly fixed to each other. Therefore, when the floor panel members 2 are installed as the entire upper surface of the floor base members 1, stability of the floor panel members 2 can be assured.

Figure 3A:
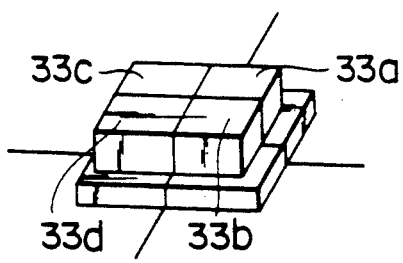
FIGS. 3A to 3C are perspective views respectively showing modifications of a connecting support member according to the first embodiment of the present invention.
Figure 3B:
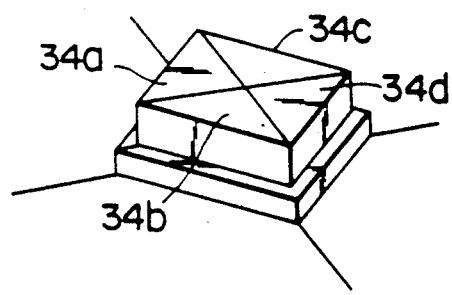
Figure 3C:
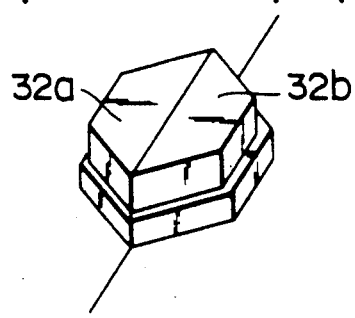

FIGS. 3A to 3C, FIGS. 4A and 4B, FIGS. 5A and 5B, and FIG. 6 are views respectively showing modifications of the coupling support member and the base joint member of the first embodiment. The connecting support member 13 extending at each corner of the floor base member 1 may be a ¼ piece (one of pieces 33a to 33d) shown in FIG. 3A or a ¼ piece (one of pieces 34a to 34d) in FIG. 3B. The connecting support member 12 extending at the edge except for any corner of the floor base member 1 comprises a ¼ piece (one of pieces 32a and 32b), as 1 comprises a ½ piece (one of pieces 32a and 32b), as shown in FIG. 3C. When these connecting support members 12 and 13 are used, base joint members (e.g., a rectangular ring) corresponding to the shapes obtained by the combinations of the support members 12 and 13 must be used.

Figure 4A:
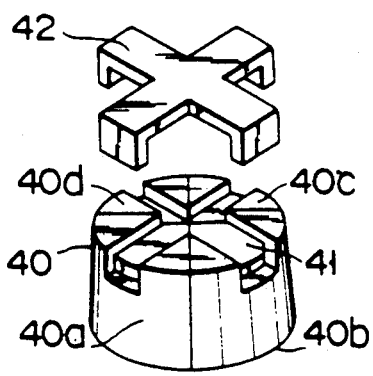
FIGS. 4A, 4B, 5A, 5B, and 6 are perspective views respectively showing modifications of a base joint member according to the first embodiment of the present invention.
Figure 4B:
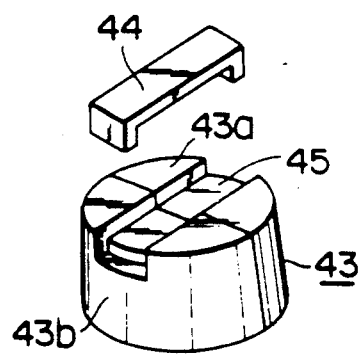

The connecting support member 13 extending at any corner of the floor base member 1 may be a ¼ piece (one of pieces 40a to 40d) obtained by dividing a member 40 (FIG. 4A) into quarters. In this case, the base joint member comprises a member 42 having a shape to fit with a cross guide groove 41 formed on the upper surface of the member 40, as shown in FIG. 4A. The connecting support member 12 extending at the edge except for any corner may be a ½ piece (one of pieces 43a and 43b) of a member 43 shown in FIG. 4B. In this case, the base joint member comprises a member 44 having a shape to fit in a guide groove 45 formed on the upper surface of the member 43, as shown in FIG. 4B.

Figure 5A:
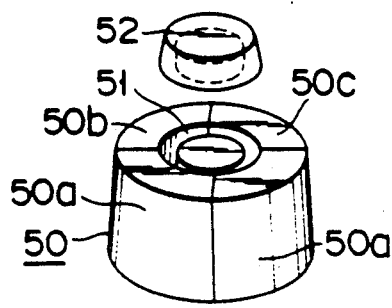
Figure 5B:
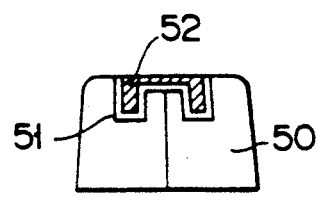

According to still another modification, the connecting support member 13 extending at any corner comprises a ¼ piece (one of pieces 50a to 50d) obtained by dividing a member 50 (FIG. 5A) into quarters. In this case, the base joint member comprises a member 52 having a shape to fit in a ring-like groove 51 formed on the upper surface of the member 50. As shown in FIG. 5B, the member 52 has a central recess and a ring-like peripheral projection fitted in the ring-like groove 51. A ½ piece of the member 50 shown in FIG. 5A may be used as the connecting support member 12 extending at the edge except for the corner. In this case, when the two connecting support members 12 are combined, the member 50 is constituted. The member 52 is fitted in the ring-like groove 51 to connect adjacent connecting support members 12.

Figure 6:
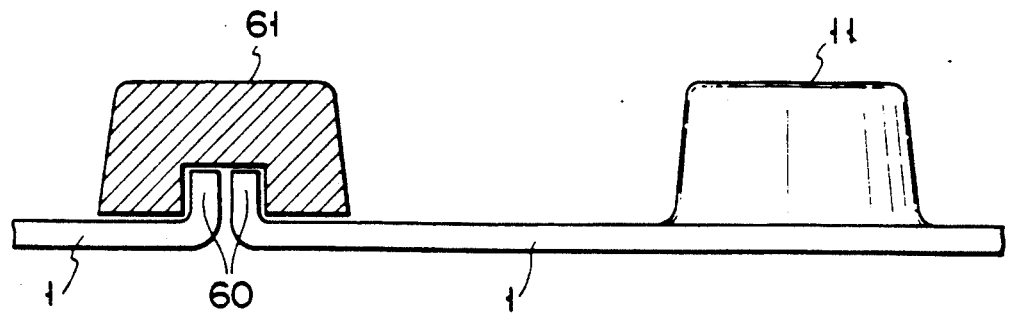

FIG. 6 shows a modification as a combination of a joint portion 60 and a connecting support member 61. The joint portion 60 formed at part of the peripheral portion of the floor base member 1 corresponds to the base joint member. The connecting support member 61 has a recess at its center. The recess is engaged with the corresponding joint portion 60 of the adjacent floor base member 1 to connect the adjacent floor base members 1.

Figure 7:
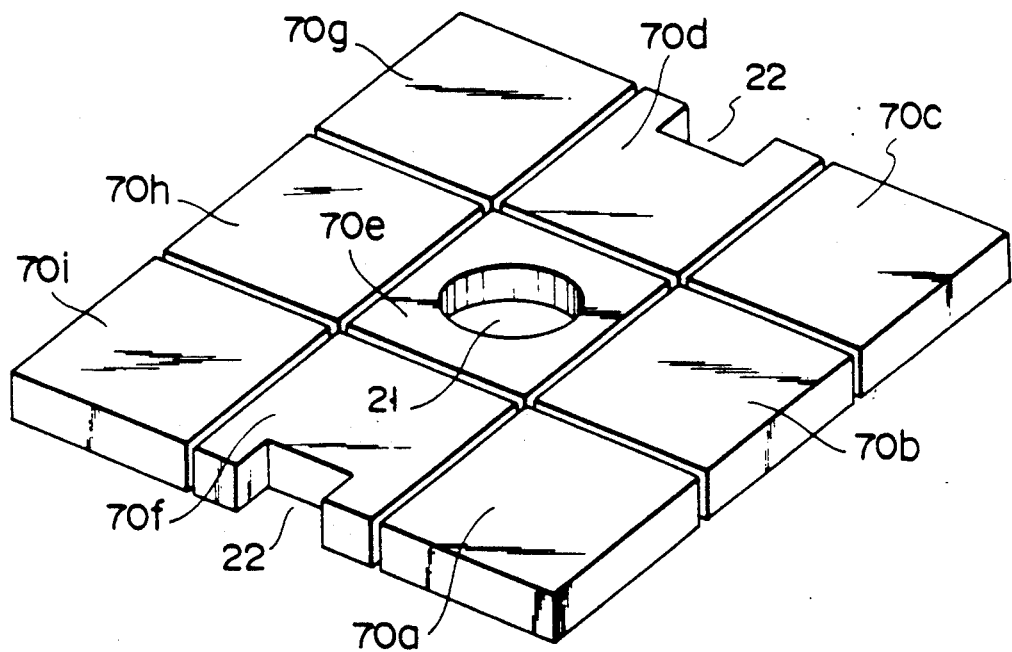
FIG. 7 is a perspective view showing a modification of a floor panel member according to the first embodiment of the present invention.

FIG. 7 shows a modification of the floor panel member according to the first embodiment. This floor panel member has nine pieces 70a to 70i connected through thin adhesive sheets, and the adhered nine pieces constitute a standard member. Any of the pieces 70a to 70i can be removed as needed. By using floor panel members as a combination obtained by using a plurality of pieces having the circular openings 21 and the rectangular notches 22, a panel shape can be arbitrarily changed.

FIGS. 8 to 11 are views showing the second embodiment.

Figure 8:
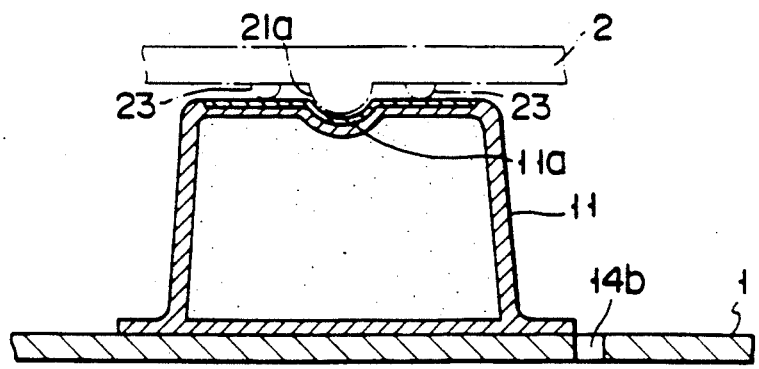
FIGS. 8 and 10 are sectional views showing a fundamental support member according to a second embodiment of the present invention.

As shown in FIG. 8, a projection 21a engaged with a recess 11a formed on almost the center of the upper surface of a fundamental support member 11 is formed on the lower surface of a floor panel member 2. The recess 11a serves to prevent lateral shift. In addition, damping members (cushion members consisting of, e.g., rubber) which are brought into tight contact with the upper surface of the fundamental support member 11 are formed at four peripheral portions of the projection 21a on the lower surface of the floor panel member 2. With this structure, when the floor panel member 2 is placed on the upper surfaces of the fundamental support member 11 and connecting support members 12 and 13, a lateral shift of the member 2 can be prevented, and the floor panel member 2 can be accurately supported.

Figure 9:
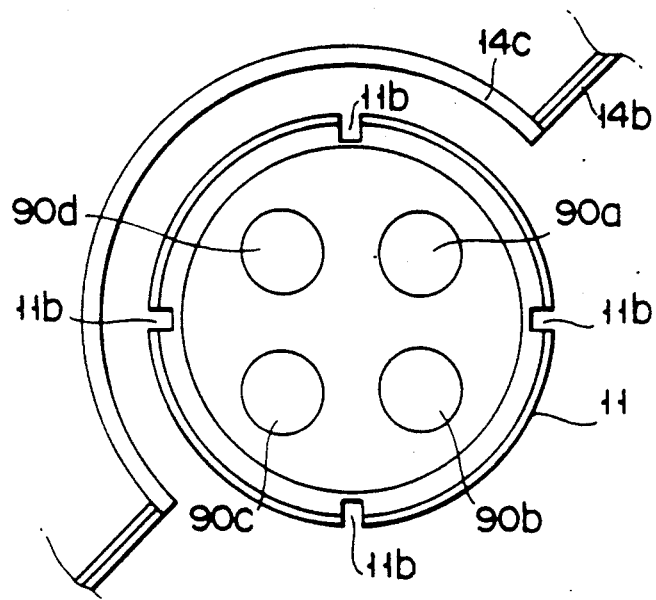
FIG. 9 is a plan view showing the fundamental support member according to the second embodiment of the present invention.
Figure 10:
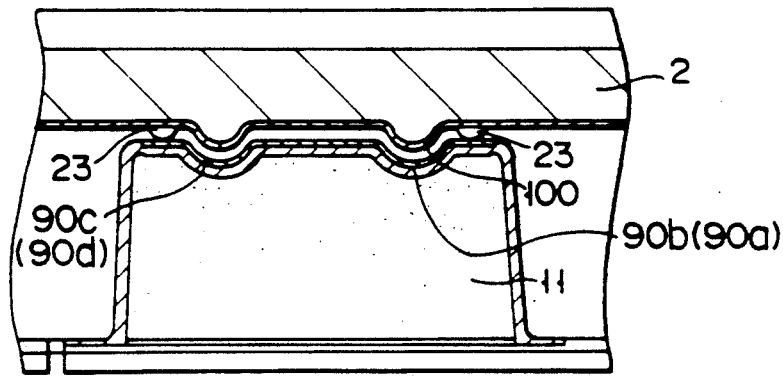

FIG. 9 is a plan view showing a modification of the above structure of the upper surface of the fundamental support member 11. Vertical grooves 11b are formed on the circumferential surface of the fundamental support members 11 to support both ends of a vertical separator member 9. The vertical separator member 9 comprises a plate member for partitioning the horizontal space on the surface of the floor base 1. A plurality (e.g., four) of recesses 90a to 90d are formed on the upper surface of the fundamental support member 11. A plurality of (e.g., four) projections 100 which respectively engage with the recesses 90a to 90d are formed on the lower surface of the floor panel member 2, as shown in FIG. 10. Damping members 23 are formed around the projections 100 on the lower surface of the floor panel member 2.

Figure 11:
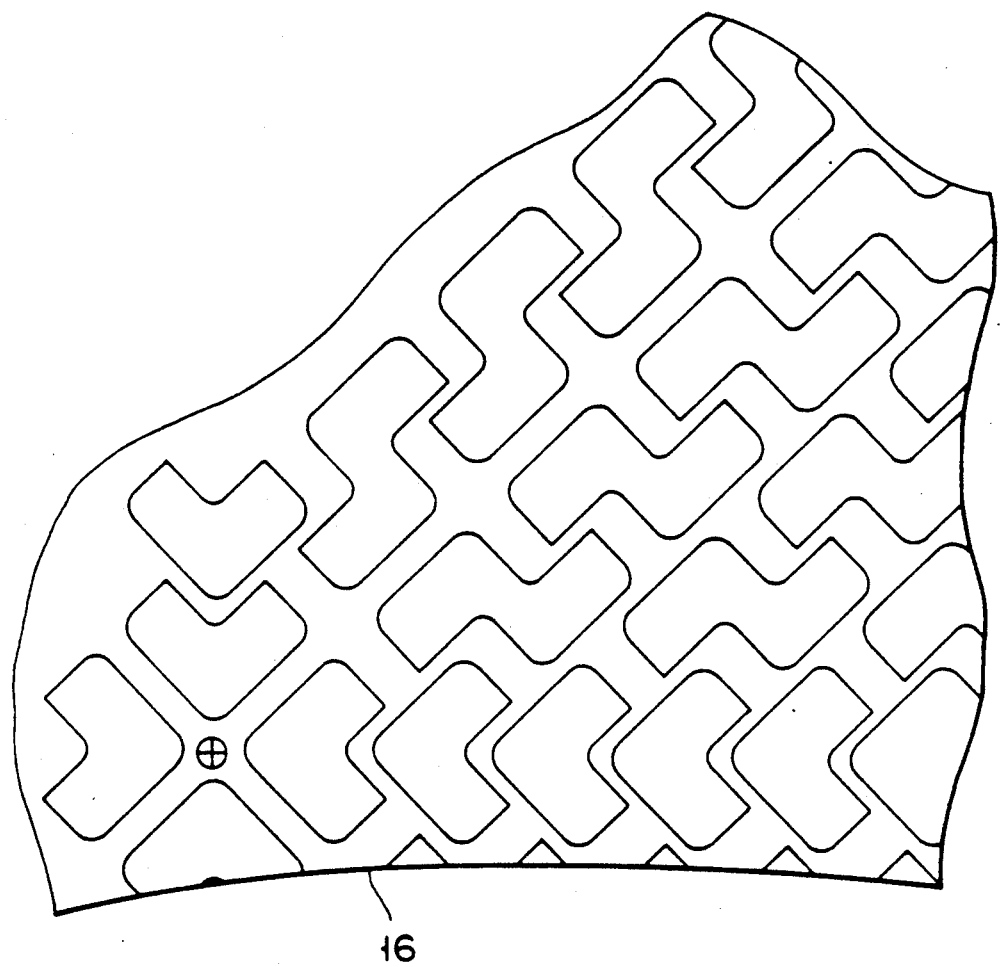
FIG. 11 is a plan view showing a floor base member according to the second embodiment of the present invention.

FIG. 11 is a view showing the lower surface (i.e., a surface which is brought into contact with the foundation floor surface of the room) of the floor base member 1. A plate-like rubber member 16 having a three-dimensional pattern for preventing slippage on its surface is adhered to the lower surface of the floor base member 1. When the floor base member 1 is installed on the fundamental floor surface of the room, unstable movement of the floor base member 1 can be prevented.

FIGS. 12A to 14C are views showing the third embodiment of the present invention.

As shown in FIG. 12A, slit-like vertical grooves 11b, 12b, and 13b are respectively formed on the circumferential wall surfaces of fundamental support members 11 and connecting support members 12 and 13, all of which extend on a floor base member 1. The vertical grooves 11b, 12b, and 13b are used to support both ends of vertical separator members 9 bridged between the adjacent support members 11 to 13 (FIG. 12B). Each vertical separator member 9 comprises a plate member to partition a horizontal space on the surface of the floor base member 1. By using these vertical separator members 9, a path of cables such as signal and power cables and a ventilation path are formed in the space defined between the floor base members 1 and the floor panel members 2.

Figure 13A:
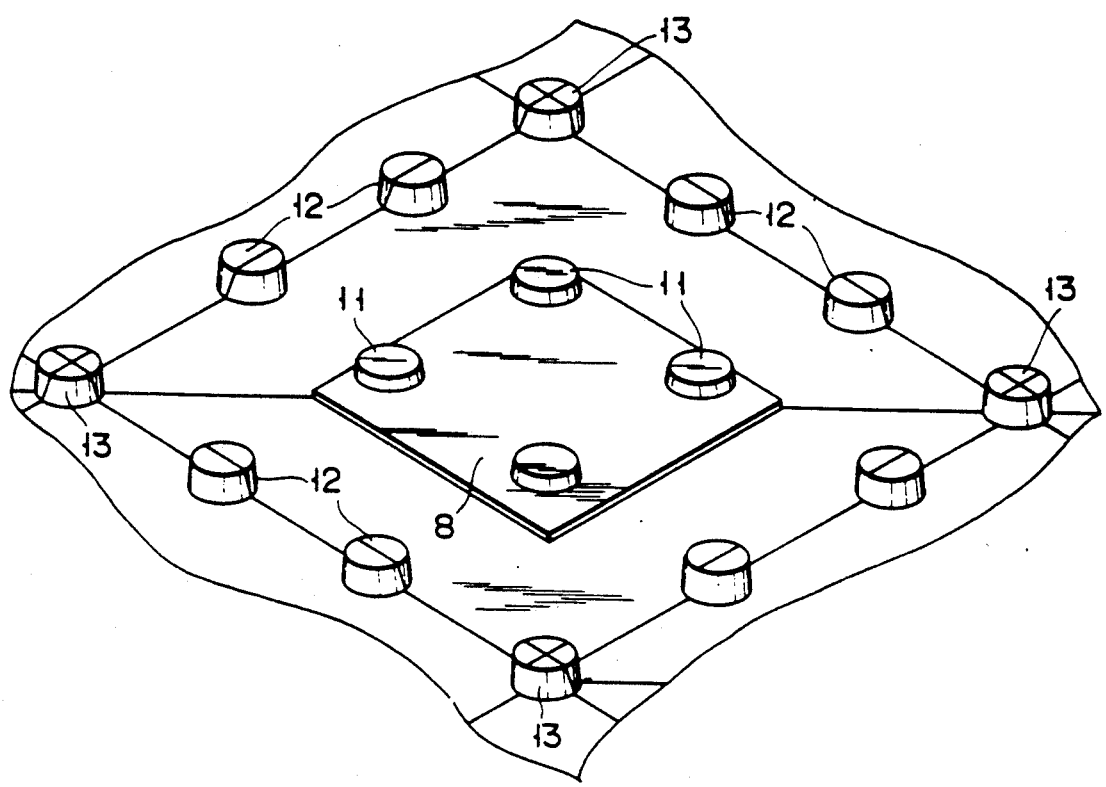
FIG. 13A is a perspective view showing an arrangement of a horizontal separator member according to the third embodiment of the present invention.

As shown in FIG. 13A, in the space defined by the floor panel member 2 and the floor base member 1, a horizontal separator 8 is prepared to partition the vertical space. Each horizontal separator member 8 comprises a plate member and is normally engaged with four adjacent fundamental support members 11 formed on the surface of the floor base member 1 to partition the vertical space. Four holes each having a diameter slightly larger than the hole at the center of the frusto-conical support member 11 are formed at four corners of the horizontal separator member 8. The horizontal separator member 8 is engaged with the adjacent fundamental support member 11 and the connecting support members 12 and 13 to partition the vertical space.

Figure 13B:
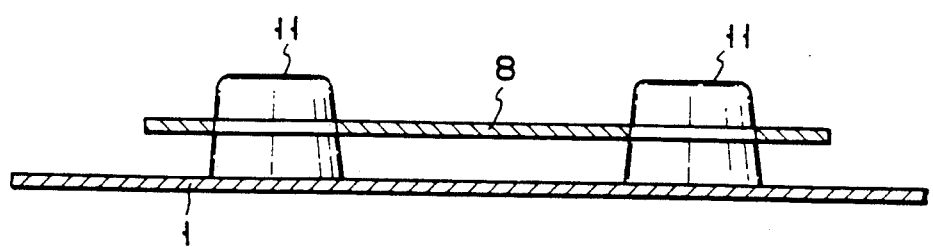
FIG. 13B is a sectional view showing an arrangement of the vertical separator member according to the third embodiment of present invention.

By using this horizontal separator member 8, the spaces above and below the flow base member 1 are assured to three-dimensionally arrange, e.g., signal and power cables, as shown in FIG. 13B.

FIGS. 14A to 14C are views showing box-like separator members 80 to 82 as modifications of the vertical or horizontal separator member. The box-like separator members 80 to 82 are made of a metal such as aluminum. The box-like separators 80 to 82 have four corners 80a to 80d which are brought into contact with the peripheral surfaces of the four adjacent fundamental support members 11 so as to conform to the circumferential surfaces. The box-like separator member 80 shown in FIG. 14A does not have side surfaces corresponding to those of the vertical separator member 9 and is used as a horizontal separator member 8. The box-like separator members 81 and 82 shown in FIGS. 14B and 14C have side surfaces 81a, 81b, and 81c corresponding to those of the vertical separator member 9 and can partition the space by means of the side surfaces. When the box-like separator members 80 to 82 are used as the horizontal separator members 8, their height must be set to be almost about ½ that of each of the fundamental support member 11 and the connecting support members 12 and 13. Therefore, the space between the floor base member 1 and the floor panel member 2 can be vertically partitioned.

Figure 15A:
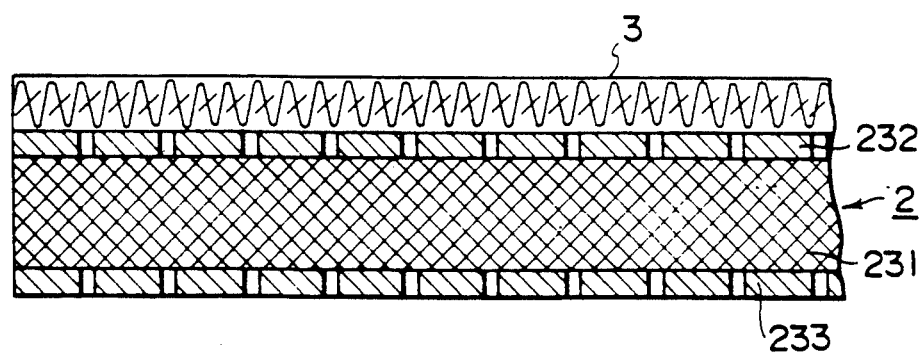
FIG. 15A is a perspective view showing a floor panel member according to a fourth embodiment of the present invention.
Figure 15B:
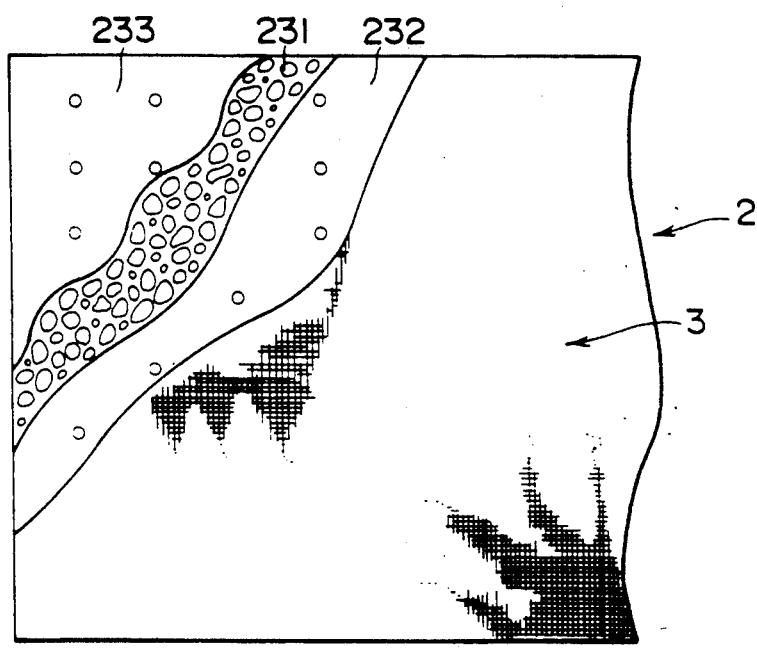
FIG. 15B is a plan view showing an arrangement of the floor panel member according to the fourth embodiment of the present invention.
Figure 16:
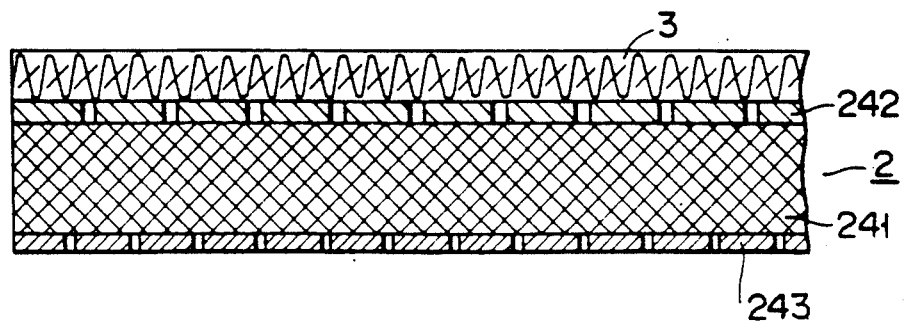
FIG. 16 is a sectional view showing a modification of the floor panel member according to the fourth embodiment of the present invention.

FIGS. 15A to 16 are views showing the fourth embodiment.

As shown in FIG. 15A (15B), a floor panel member 2 comprises a foamed metal base member 231, a cover member 232 consisting of a punching metal and formed on the upper surface of the base member 231, and a cover member 233 consisting of a punching metal and formed on the lower surface of the base member 231. With this structure, a floor reinforced by the cover members 232 and 233 and having an excellent ventilation property can be obtained.

As shown in FIG. 16, the floor panel member 2 comprises a base member 241 of a honeycomb structure consisting of a foamed metal, a ceramic, a metal plate of aluminum or the like, or paper. A cover member 242 consisting of a punching metal is formed on the upper surface of the base member 241. A reinforcing member 243 consisting of carbon fibers is formed on the lower surface of the base member 241. A floor carpet 3 is installed on the upper surface of the cover member 242. With this structure, the same ventilation property as that in FIG. 15A can be obtained, and the floor is reinforced with the cover member 242 and the reinforcing member 243.

FIGS. 17A and 17B are views of the fifth embodiment.

As shown in FIG. 17A, a fundamental support member 11 and connecting support members 12 and 13 extend on a floor base member 1 to support a floor panel member 2. V-grooves 14a are formed on the surface of the floor base member 1 by a line connecting middle points of the long sides of the floor base member 1 and diagonals of rectangles (squares) of the rectangular floor base member 1 so as to connect between the support members 11 to 13. Grooves 14b are formed to surround a ½ bottom arc of each fundamental support member 11 and the entire bottom arc of each connecting support member 12. A groove 14c is also formed to surround the entire bottom arc of each connecting support member 13 extending at any corner. The grooves 14a to 14c serve as guide grooves for discharging leaking water. Guide holes 15 for discharging the leaking water to the foundation floor surface are formed in the V-grooves 14a at predetermined intervals (FIG. 17B). With this structure, water leaking on the upper surface of the floor base member 1 is guided to the guide holes 15 through the grooves 14a to 14c, thereby effectively discharging water to the foundation floor surface. Therefore, the cables and various devices arranged between the floor base member 1 and the floor panel member 2 can be protected from any trouble caused by water leakage, thereby maintaining a stable system operation.

As shown in FIG. 17B, wiring patterns P for detecting water leakage are formed at both sides of the V-groove 14a to constitute a water leakage sensor. The wiring patterns P are connected to a sensor circuit 170 arranged at a predetermined position of the floor base member 1. When leaking water is brought into contact with the wiring patterns P, e.g., when a circuit consisting of the leaking water and the wiring patterns P is formed, the sensor circuit 170 outputs a detection signal to drive, e.g., a buzzer unit. The wiring patterns P may be formed near other grooves 14b and 14c in addition to the portions adjacent to the V-groove 14a. With this arrangement, when water leakage occurs on the floor base member 1, it can be detected and alarmed. Therefore, the leaking water can be immediately removed, and the cables and various devices arranged between the floor base member 1 and the floor panel member can be protected from any trouble caused by water leakage.

Figure 18A:
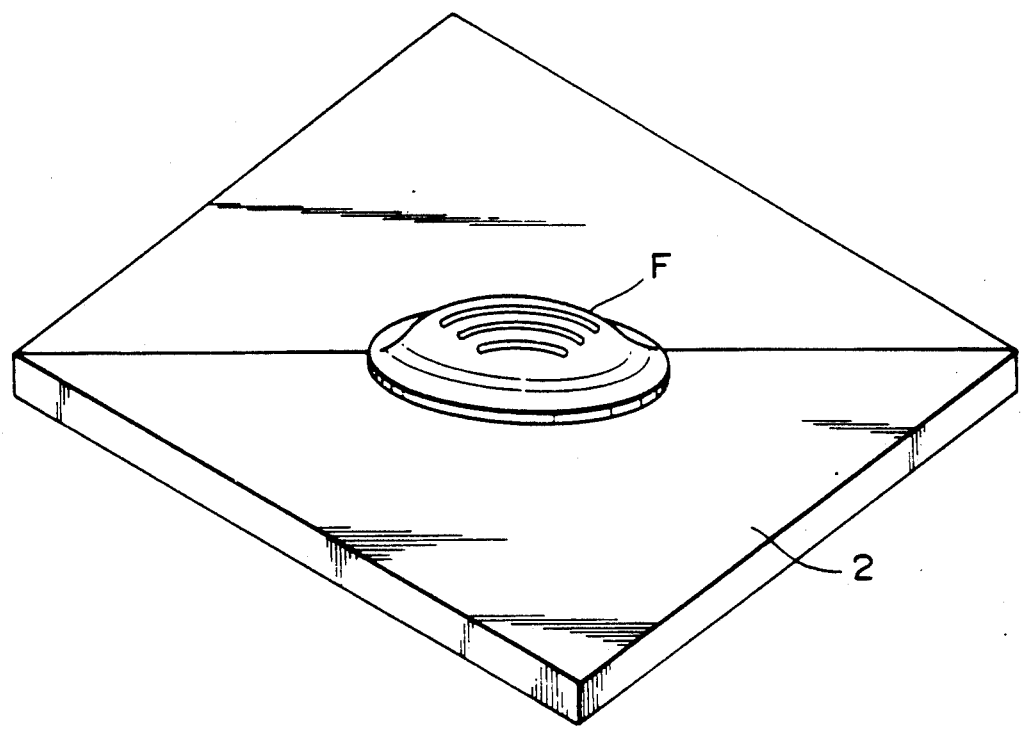
FIG. 18A is a perspective view showing an arrangement of a floor panel member with a fan unit according to a sixth embodiment of the present invention.
Figure 18B:
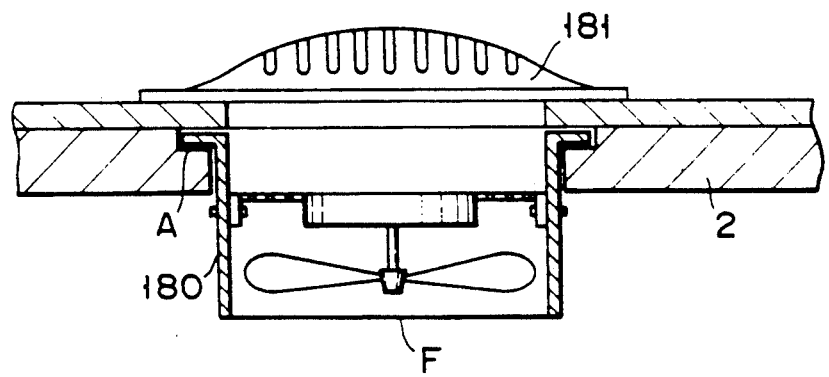
FIG. 18B is a sectional view showing an arrangement of the floor panel member with the fan unit according to the sixth embodiment of the present invention.
Figure 19:
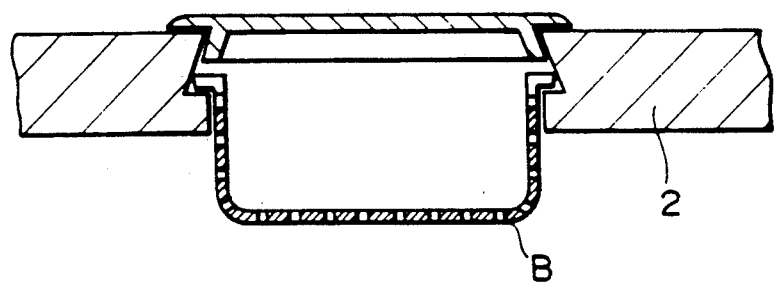
FIG. 19 is a sectional view showing an arrangement of a floor panel member with a basket according to the sixth embodiment of the present invention.

FIGS. 18A to 19 are views showing the sixth embodiment of the present invention.

As shown in FIGS. 18A and 18B, a fan unit F is mounted utilizing a circular opening 21 of a floor panel member 2 to constitute a ventilation system. The fan unit F is held by a device support mechanism 180 provided to the lower surface of a floor panel member 2. A vent port 181 is formed on the upper surface of the floor panel member 2. By utilizing the vertical separator members 9, a ventilation duct is formed between the floor base member 1 and the floor panel member 2. The ventilation duct, the fan unit F, and the vent port 181 constitute a ventilation system (or air-conditioning system).

As shown in FIG. 19, a basket B corresponding to a device support mechanism 180 is formed on the lower surface of a floor panel member 2 by utilizing a circular opening 21. For example, an insecticide or desiccant may be stored in the basket B to kill harmful insects entering the space between the floor base member 1 and the floor panel member 2 or remove humidity. Therefore, a good environment can be maintained for the cables and various devices arranged between the floor base member 1 and the floor panel member 2.

FIGS. 20 to 23 are views showing the seventh embodiment.

Figure 20:
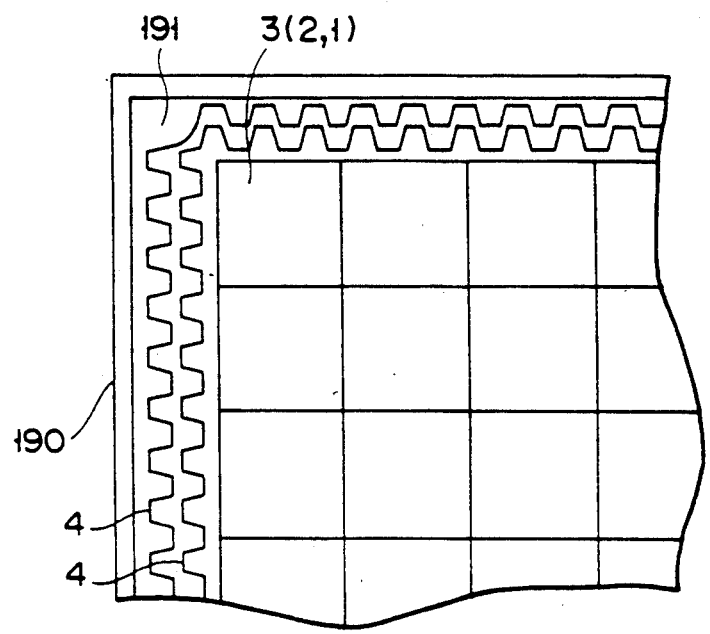
FIG. 20 is a plan view showing a layout of a boarder fundamental member according to a seventh embodiment of the present invention.

As shown in FIG. 20, floor base members 1, floor panel members 2, and floor carpets 3 are sequentially installed on a foundation floor surface of a room 190 to constitute an upper floor surface of the room 190. There is a corner 191 of the room 190 where the members 1 to 3 cannot be installed. Boarder fundamental members 4 are installed on the foundation floor surface of the room 190 at this location (i.e., a boarder area). Each boarder fundamental member 4 comprises a strip member having a rectangular wave shape and a predetermined width. A plurality of boarder fundamental members 4 are combined in accordance with the size of the boarder area and are installed in the boarder area. In this case, as shown in FIG. 1, the boarder columnar joint 4a is fitted in the joint mounting groove 41 arranged in each boarder fundamental member 4, so that the boarder fundamental members 4 are integrally formed. A boarder floor panel 5 is placed on the upper surface of each boarder fundamental member 4. The boarder floor panel 5 has longitudinal grooves which can be cut to have a predetermined width in accordance with the size of the boarder area. In addition, a boarder floor carpet 6 similar to the floor carpet 3 is placed on the upper surface of the boarder floor panel 5.

Figure 21A:
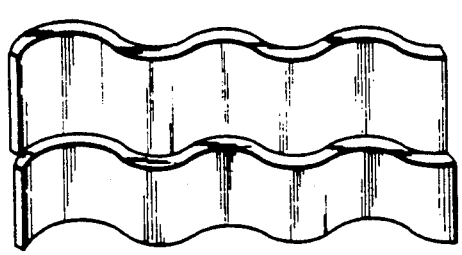
FIGS. 21A and 21B are perspective views showing arrangements of the border fundamental members according to the seventh embodiment of the present invention.
Figure 21B:
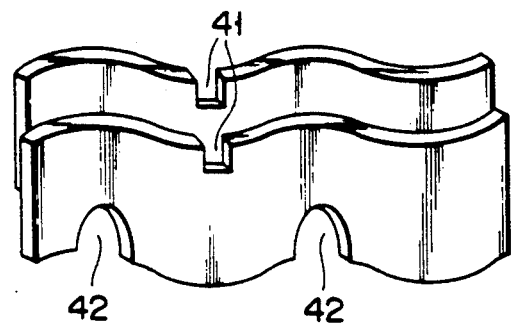
Figure 22A:
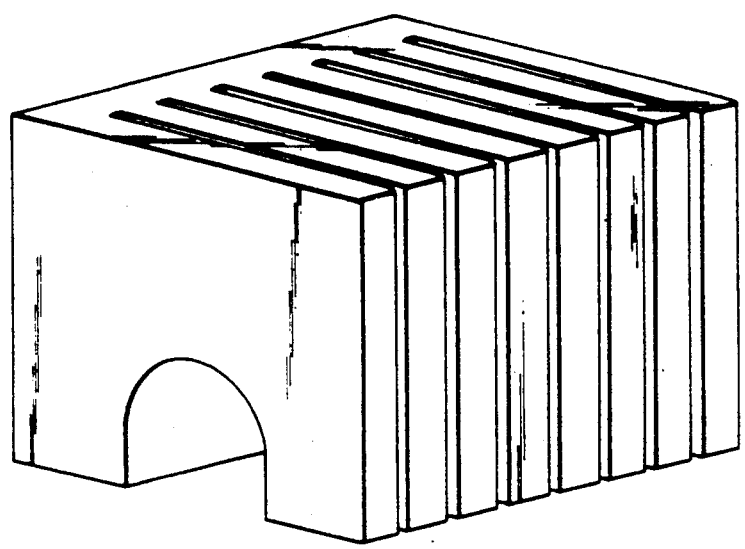
FIG. 22A is a perspective view showing a modification of the boarder fundamental member according to the seventh embodiment of the present invention.
Figure 22B:
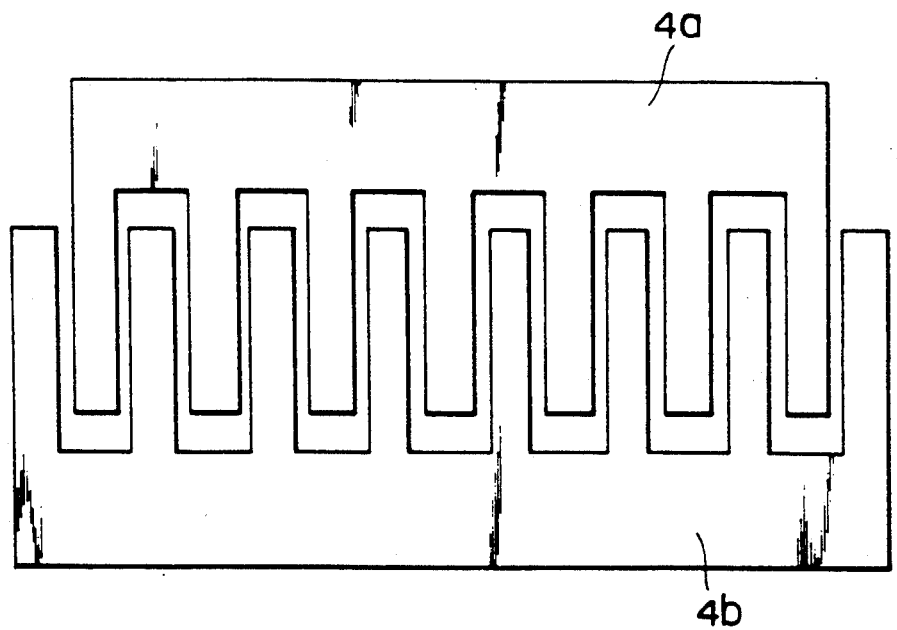
FIG. 22B is a plan view showing the member shown in FIG. 22A.

The boarder fundamental member 4 may have a strip member having a corrugated shape, as shown in FIG. 21A. As shown in FIG. 21B, a joint mounting groove 41 and semispherical openings 42 for wiring may be formed in the corrugated boarder fundamental member 4. When the signal or power cables are installed on the foundation floor surface of the room 190, each cable extends through the opening 42 as needed. In addition, as shown in FIG. 22A, the boarder fundamental member 4 may have a comb-like shape. When a plurality of comb-like boarder fundamental members 4a and 4b are combined, an interdigital pattern is formed, as shown in FIG. 22B.

Figure 23:
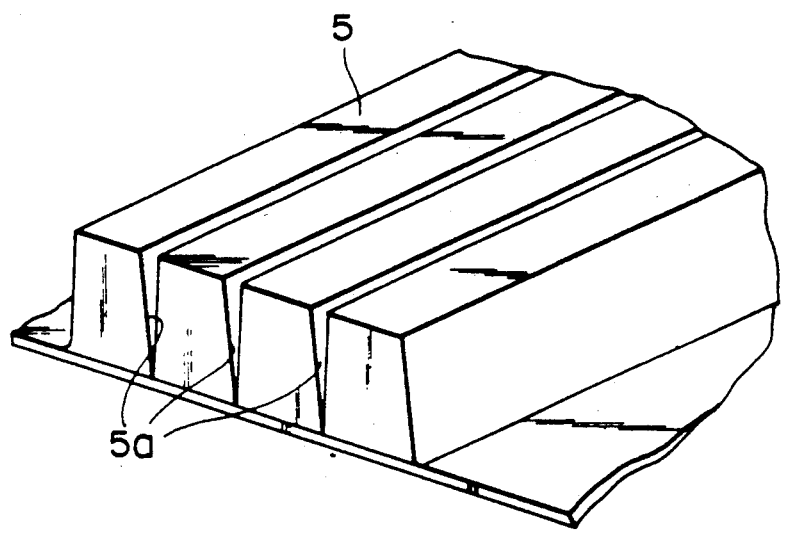
FIG. 23 is a perspective view showing an arrangement of a boarder floor panel member according to the seventh embodiment of the present invention.

The boarder floor panel 5 has longitudinal grooves 5a so as to be cut to have a predetermined width, as shown in FIG. 23. Therefore, the boarder floor panel 5 is cut at a predetermined longitudinal groove 5a in accordance with the size of the boarder area, thereby forming a boarder floor panel 5 having an optimal size.

By using the boarder fundamental members 4, the boarder floor panels 5, and the boarder floor carpets 6, the floor surface of the room can be formed together with the members 1 to 3 in the boarder area where the members 1 to 3 of the room cannot be installed.

What is claimed is:

1. An interior panel unit for permitting an arrangement of cables and devices on the floor of a room, for installation on a foundation floor of the room, said panel unit comprising:
   a floor base member to be installed on a foundation floor of the room;
   a plurality of fundamental support members fixed to an upper surface of each of said floor base member, and having upper surfaces located at the same height from said upper surface of each floor base member;
   a plurality of connecting support members fixed to peripheral portions of each floor base member, and having upper surfaces located the same height as those of said fundamental support members;
   base joint members for connecting said connecting support members arranged on a plurality of said floor base members in a state wherein the floor base members are installed on the same surface; and
   floor panel members brought into contact with said upper surfaces of said plurality of fundamental support members and said upper surfaces of said connecting support members to form a surface of the room floor and cooperating with said floor base members to define an internal space for installing cables and devices therein; and further comprising leakage water guide grooves formed on said floor base member along lines obtained by connecting said fundamental support members or said connecting support members.

2. An interior panel unit according to claim 1, further comprising guide holes formed in said leakage water guide grooves to guide leakage water to said foundation floor surface.

3. An interior panel unit according to claim 1, further comprising a sensor, formed at an edge of said leakage water guide groove on said upper surface of said floor base member, for detecting water leakage.

* * * * *